United States Patent
Harbin

(10) Patent No.: US 8,925,475 B2
(45) Date of Patent: Jan. 6, 2015

(54) HIGH-SPEED MARINE VESSEL HAVING AERODYNAMICALLY SUSPENDED CABIN OR COCKPIT

(71) Applicant: Lawrence Harbin, Alexandria, VA (US)

(72) Inventor: Lawrence Harbin, Alexandria, VA (US)

(*) Notice: Subject to any disclaimer, the term of this patent is extended or adjusted under 35 U.S.C. 154(b) by 141 days.

(21) Appl. No.: 13/782,002

(22) Filed: Mar. 1, 2013

(65) Prior Publication Data
US 2013/0319310 A1 Dec. 5, 2013

Related U.S. Application Data

(60) Provisional application No. 61/689,333, filed on Jun. 4, 2012.

(51) Int. Cl.
*B63B 1/16* (2006.01)
*B63B 29/00* (2006.01)
*B63B 1/32* (2006.01)
*B63B 17/00* (2006.01)

(52) U.S. Cl.
CPC .............. *B63B 29/00* (2013.01); *B63B 1/322* (2013.01); *B63B 2221/20* (2013.01); *B63B 2017/0072* (2013.01); *Y02T 70/12* (2013.01)
USPC ........................................................ 114/273

(58) Field of Classification Search
USPC ..................... 440/37; 114/272, 273
IPC ......................................................... B63B 1/322
See application file for complete search history.

(56) References Cited

U.S. PATENT DOCUMENTS

| | | | | | |
|---|---|---|---|---|---|
| 1,825,363 | A | * | 9/1931 | Robertson | 434/37 |
| 2,493,482 | A | * | 1/1950 | Fish | 434/37 |
| 4,364,322 | A | * | 12/1982 | van Roon | 114/71 |
| 5,082,198 | A | * | 1/1992 | Patel | 244/2 |
| 5,207,408 | A | * | 5/1993 | Burg | 248/550 |

* cited by examiner

Primary Examiner — Stephen Avila
(74) Attorney, Agent, or Firm — Harbin & Hein PLLC

(57) ABSTRACT

A floating cabin or cockpit for a marine vessel to achieve smooth rides in rough seas when traveling at high speeds. In response to vessel speed, the cabin is aerodynamically lifted and suspended between upper and lower limits. The cabin includes a wing structure for aerodynamic lift; a suspension and tethering mechanism interconnecting the cabin with a hull structure of the vessel to allow substantially free, unimpeded vertical, lateral and/or longitudinal excursions of the cabin between predefined limits when underway at high speeds; and a helm station to control the vessel and/or orientation of the cabin when freely floating. A multi-wing structure may provide addition lifting force and/or spring biasing may be provided to reduce aerodynamic lifting requirements for heavy cabin loads. The invention also helps to reduce vessel displacement, which improves fuel economy.

20 Claims, 10 Drawing Sheets

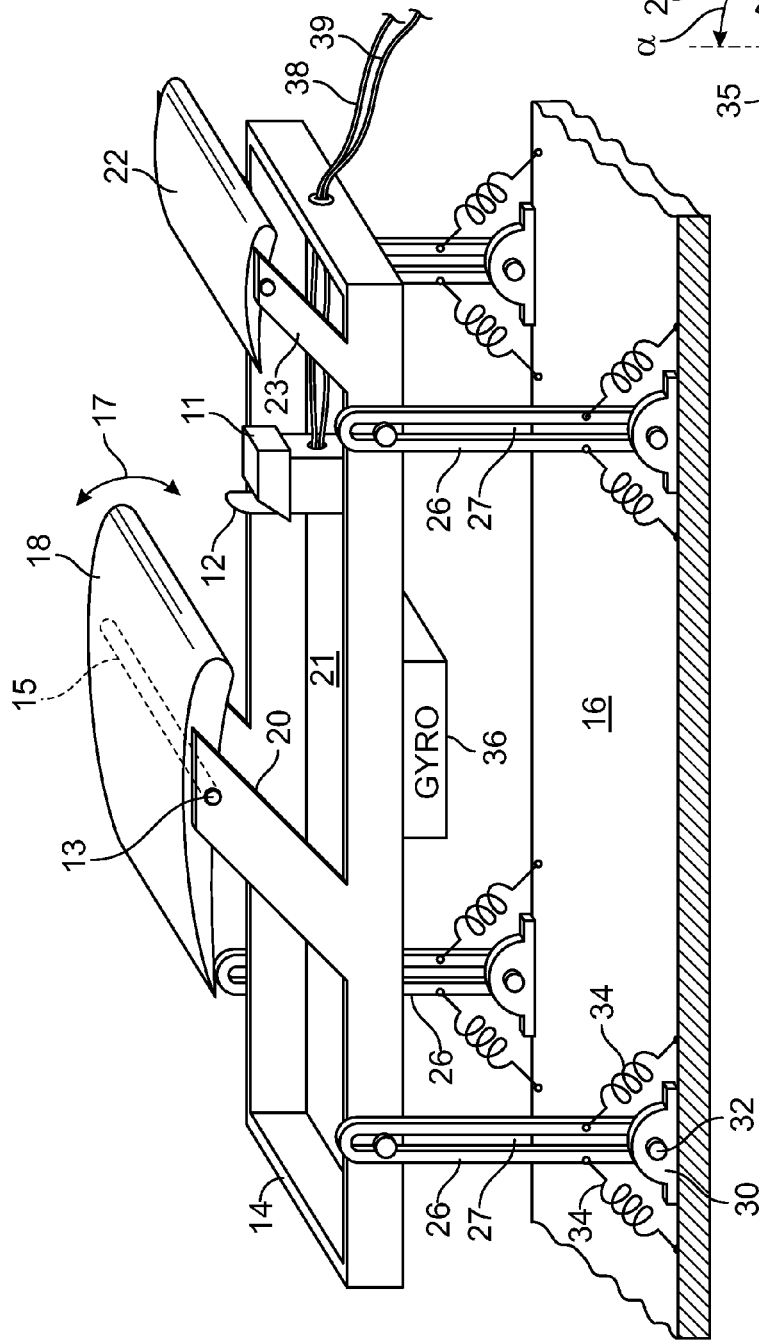
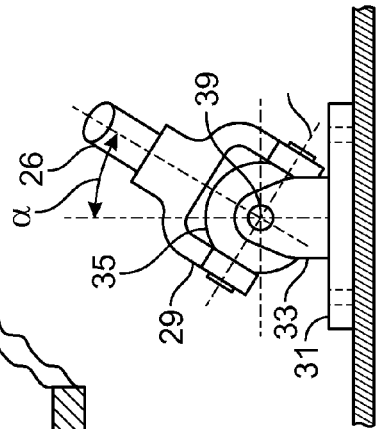
FIG. 2
FIG. 3

HIGH-SPEED MARINE VESSEL HAVING AERODYNAMICALLY SUSPENDED CABIN OR COCKPIT

CROSS-REFERENCE TO RELATED APPLICATION

This invention claims the benefit of U.S. Provision Application 61/689,333 filed Jun. 4, 2012 in the name of the same inventor hereof and entitled High Speed Marine Vessel Having Aerodynamically Suspended Cabin or Cockpit.

BACKGROUND

The present invention addresses problems encountered during high-speed marine transport, but more specifically, the invention concerns a surface-planing marine vessel utilizing a method and/or an apparatus to aerodynamically suspend or levitate a passenger cabin or cockpit above the hull structure of the vessel in order to lessen unwanted effects of wave impact when running in rough water at high speeds.

High speeds have been achieved at the expense of passenger comfort through various hull modifications, such as proving an air cushion, ventilating steps and/or other friction reduction systems. For vessel speeds exceeding thirty to sixty knots, for example, achieving passenger comfort and operational performance continue to be challenges in rough water. Passengers and crew suffer from motion sickness due to constant pounding and slamming of the hull against waves, and fuel economy of the vessel also worsens in rough seas. For vessels less than one hundred tons, for example, prior solutions to provide comfort and to reduce motion sickness simply involved slowing the vessel to a hull speed of a few knots or employing a deck displacement system, either active and passive, to lessen wave impact.

The present invention reduces motion sickness, provides passenger and crew comfort, and addresses other transport problems when running at high speeds in rough seas without substantially altering the vessel's form factor, which advantageously enables the vessel to use existing conventional port facilities.

SUMMARY

According to a first aspect of the invention, there is provided a high-speed marine vessel comprising a hull structure, a cabin compartment that is separable from the hull structure, a wing structure to aerodynamically lift and suspend the cabin in response to wind speed of the vessel, a suspension and tethering mechanism interconnecting the cabin and hull structure to allow substantially free, unimpeded vertical, longitudinal and/or lateral excursions of the cabin between predefined limits when aerodynamically suspended, and a helm station to control the vessel while the cabin is aerodynamically suspended. Additional features include a biasing spring to apply an upward lifting force to the cabin in order to reduce aerodynamic lifting requirements of the wing structure in order to elevate the cabin, and a stabilizing gyroscope to stabilize orientation of the cabin against pitch and/or rolling motions of the vessel. A variety of suspension mechanisms may be employed including suspension arms that further include biasing springs to hold the suspension arms, and consequently, the cabin, in a near-vertical position. The suspension system, among other mechanical elements, may comprise elongated suspension arms, telescoping arms, or articulated arms having pivoting joints. The wing structure may have aerodynamic control surfaces including an aileron, trim tab, wing flap, or wing slat, and also a vertical stabilizer with a rudder control surface. The cabin may include a secondary forewing to provide additional lift and/or pitch control and the wing structure may comprise a multi-wing structure.

Another aspect of the invention comprises a method of reducing wave impact forces on a cabin of a marine vessel when underway in rough water, wherein the method comprises providing a cabin for the vessel, providing a wing structure coupled to the cabin, providing a suspension system that permits unimpeded vertical, longitudinal and/or lateral excursions of the cabin relative to the vessel, accelerating the vessel to an aerodynamic lifting speed for the cabin, and aerodynamically lifting the cabin whereby to reduce wave impact forces on the cabin. The method may include the step of applying an upward biasing force to the cabin to reduce amount of lift required of the wing structure to raise the cabin; applying a biasing force to position the cabin between upper and lower limits of the suspension system; utilizing a stabilizing gyroscope coupled to the cabin to stabilize orientation of the cabin against pitch and/or rolling motions; biasing the suspension system to hold the cabin in a neutral fore-aft position when aerodynamically lifted by the wing structure; providing an aerodynamic control surface for the wing structure that comprises at least one of an aileron, trim tab, wing flaps, or wing slats; and/or providing a multi-wing structure to provide increased lift for said cabin.

According to yet another aspect of the invention, there is provided a cabin assembly capable of being freely suspended when elevated above a hull structure of a marine vessel, wherein the cabin assembly comprises a wing structure to aerodynamically lift the cabin from the hull structure in response to vessel speed; a suspension mechanism coupled with the hull structure to allow substantially free, unimpeded vertical excursions of the cabin assembly when aerodynamically suspended; and a helm station to control the vessel during aerodynamic suspension of the cabin when proceeding over water. Other features of the cabin assembly include a biasing mechanism to apply an upward biasing force to the cabin in order to reduce weight-lifting requirements of the wing structure; a forewing to provide addition lift and/or pitch control of the cabin assembly when aerodynamically suspended; and/or a lifting mechanism to control height of cabin elevation when docked at a port facility.

Other features of the invention will become apparent to those having skill in the art upon review of the following description taken in connection with the accompanying drawings. The invention, though, is pointed out with particularity by the appended claims.

BRIEF DESCRIPTION OF THE DRAWINGS

FIG. 2 shows an example of a mechanism for enabling unimpeded vertical excursions of the cabin/cockpit when tethered or suspended above an aft deck of a vessel, as well as a helm station having flexible control links extending therefrom for controlling various accessories of the vessel, according another aspect of the invention.

FIG. 3 shows an alternative connection mechanism for the tethering arms of FIG. 2 to enable two-axis pivoting thereof, similar to a universal joint, which allows unimpeded abeam displacement, fore-aft displacement, and three-axis rotation of the cabin/cockpit to attain or maintain any desired attitude or orientation.

DESCRIPTION OF ILLUSTRATIVE EMBODIMENTS

Figure 1A:
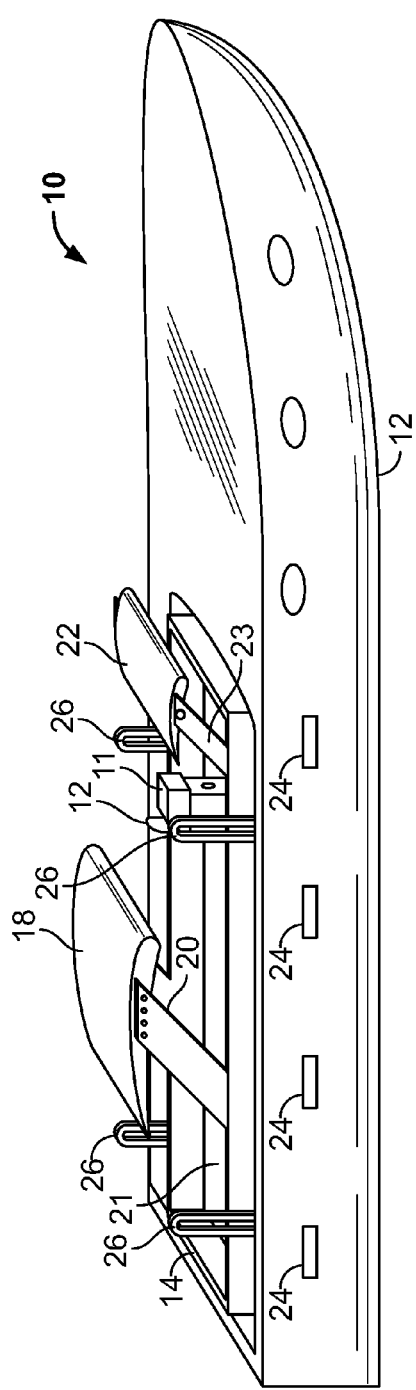
FIGS. 1A and 1B respectively show a cabin or cockpit of a vessel positioned in a refracted position at low vessel speeds and positioned in an aerodynamically lifted, or vertically extended position at high vessel speeds in accordance with an aspect of the present invention.

High speed running in rough water constantly subjects the vessel, and consequently the passengers, crew and cargo to abrupt decelerations and impact forces as the hull penetrates, pounds and slams against waves. The present invention, among other things, aims to provide passenger and crew comfort by enabling a smooth ride in a suspended passenger cabin or cockpit of the vessel when running at high speeds in rough seas without major modifications to a vessel structure. This is achieved by separating from the vessel and stabilizing the passenger cabin or cockpit "in flight" rather than attempting to stabilize the entire vessel or a deck system against wave motion and impacts, as previously attempted by prior systems. The invention is particular useful for extended journeys in surface-planing vessels ranging in length from ten to fifty meters, more or less, and running at speed exceeding forty to eighty knots or more, but the invention also may be adapted to smaller or larger high-speed vessels subjected to abrupt jarring due to wave impact. Moreover, the invention also enables high-speed carriage of delicate cargo in rough seas. A flexible jetway, e.g., a passenger/crew conduit, also may be provided to enable access from the floating cockpit to a lower cabin area or cargo hold of the vessel.

In addition to lessening or removing effects of wave impact, other advantages of the invention include lessening or eliminating effects of engine noise and vibrations from passengers and crew, confining a wing structure within the beam width of the vessel to enable use of conventional port facilities, providing roll and pitch stability of the cabin or cockpit thereby eliminating motion sickness, lessening displacement of the vessel in water upon aerodynamic lifting of the passenger cabin (and optionally lifting a portion of the remaining weight of the vessel) thereby improving fuel economy and speed, and/or enabling aerodynamic steering of the vessel rather than steering by a conventional drag-inducing rudder. In addition, the vessel's tethered, levitated, or suspended cabin or cockpit may be configured as life boat separable from the main vessel to be completely detached in the event of a hull breach. Also, when underway at slow hull speeds in stormy seas, retraction of the cabin or cockpit within the hull structure provides a low center of gravity for increased roll stability whereas, when running at high speeds, the vertically extended or elevated cabin or cockpit provides greater visibility for improved visual and/or radar navigation, and does not contribute much the deleterious rolling or pitching moments since the momentum otherwise injected by cabin weight is removed from the vessel upon aerodynamic lifting of the cabin. Further, when circumstances or sea conditions permit, space underneath the cabin when raised may be used for other uses including cargo carriage, salon, birth, or other quarters.

Benefits of the invention are achieve by providing a wing structure within the confines of the vessel's beam width, accelerating the vessel to a high speed, and then aerodynamically "flying" or "floating" the cabin or cockpit a few inches to a few feet above the hull structure but maintaining a tethered connection therewith via tension cables or a series of extension, telescoping, or articulated arms having pivoting connections with the main deck or hull structure. Alternatively, the wing structure may extend beyond the beam width of the vessel if operating circumstances permit.

The required height of suspended cabin above the hull structure will varying according to wave height, wave period, wave steepness, deadrise of vessel hull, weight of vessel, speed of vessel, and other factors. By way of example, a hull of a high-speed offshore vessel having a twenty-degree deadrise encountering three to four feet waves may experience vertical excursions of a few inches to about one foot, or about a foot-and-a-half when encountering an occasional five to six-foot wave in nominal three to four feet seas. Thus, in this case, a cabin elevation or unimpeded vertical excursion of about two feet should adequately shield the cabin from the effects of wave impacts. In addition to protection against short-period steeper wind waves, unimpeded larger vertical excursions may also be provided in the suspension mechanism of the present invention in order to shield cabin movements from the effects of ocean swells or rolling seas having longer periods but higher wave heights.

Figure 1B:
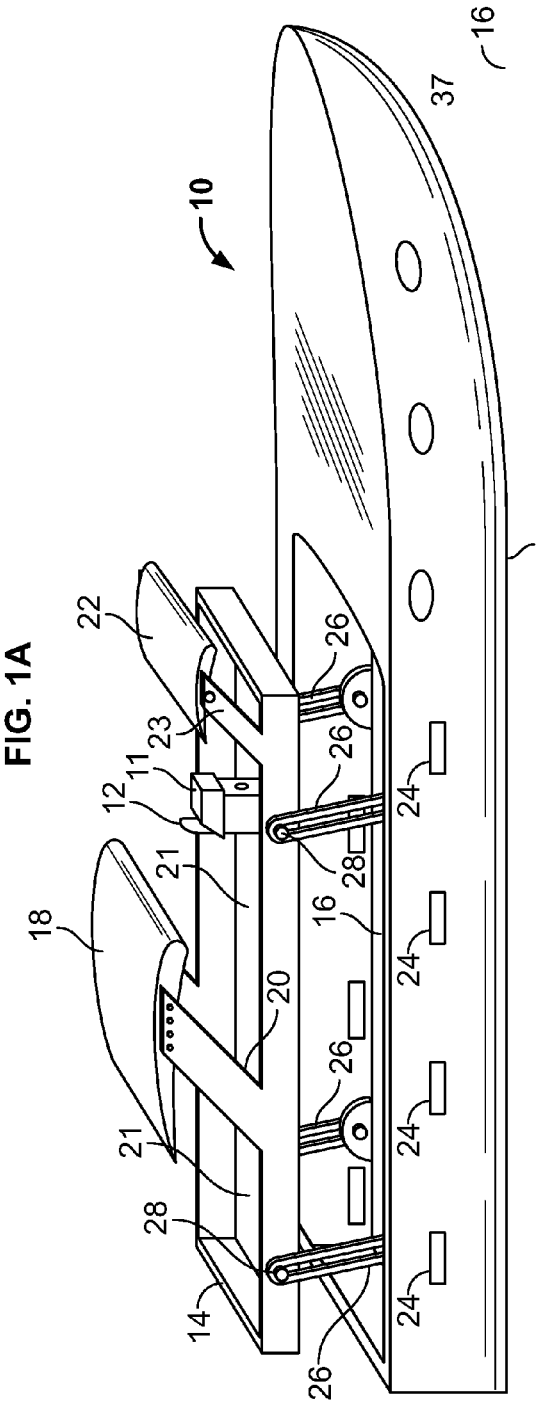

By way of illustration, FIGS. 1A and 1B show one embodiment of the invention where a marine surface vessel 10 includes a hull 12, a cabin 14, and a power plant and drive system (not shown) to enable the vessel to plane over the surface of a body of water at high speeds in the range of forty to eighty knots or more. Cabin 14 may include a helm station (not shown), seats (not shown) for crew members and passengers, and/or other implements and accessories for the vessel or passengers. As used herein, the term cabin includes cockpit, wheelhouse, pilot house, helm station or other compartment occupied by passenger or crew members.

According to an aspect of the present invention, cabin 14 lies in a retracted position upon or near a main aft deck 16 when the vessel is at rest or underway at low speeds, as shown in FIG. 1A. Subsequently, cabin 14 may be aerodynamically lifted to a vertically extended position, as shown in FIG. 1B, when the vessel attains a high speed. A main wing structure 18 having a width coincident with the beam width of the vessel and that may optionally be pivotably connected to cabin 14 via struts 20 provides the lifting force at high vessel speeds, e.g., forty knots and above. The speed at which cabin 14 becomes lifted to an extended position generally depends on the size of wing structure 18, cabin weight, and relative speed of air over wing structure. Because wing structure 18 does not protrude abeam of the vessel, a vessel so configured according to the present invention may continue to meet berthing and pathway clearances for conventional slips and traditional port facilities.

Pivoting mechanism for wing structure 18 enables changing an angle of attack thereby regulating or controlling the amount of lift to compensate for lower or higher relative wind speeds, i.e., air speed, depending on when the vessel travels in an upwind or downwind direction. Angle of attack of wing structure 18 may also be altered to adjust the amount of lift needed according to air speed and/or cabin loading. Rather than fixedly attaching wing structure 18 to strut 20, as shown in FIG. 1A, a wing spar extending laterally through the wing abeam of the vessel as shown in FIG. 2 may extend into and pivot in direction of arrow 17 upon circular insets 13 (only one shown) disposed in upper regions of side struts 20.

By way of example, a wing structure 18 having a chord length of about ten feet together with a five foot cord in a forewing 22 and with both wings having a width coincident with a twenty-feet beam of a vessel eighty feet in length should provide a lifting force of three to eight thousand pounds somewhere between sixty and eighty knots relative air speed across the wing structure, depending on angle of attack relative to air flow. Because the width of the wing structures 18 and 22 does not protrude beyond the vessel's beam width, the vessel may continue to utilize conventional narrow slips, waterways, channel passages, and port facilities. In addition, retraction of cabin 14 within the vessel structure advantageously enables passage under a low bridge or other clearance.

Forewing 22 may optionally be utilized to provide additional cabin balancing and/or lifting force at a fore section of cabin 14. Forewing 22 may also pivot on strut 23 to control lifting force thereat, and thus, the pitch orientation of the cabin. In an alternative arrangement, forewing 22 may be positioned forward of cabin over the bow of the vessel, for example, and be coupled to cabin 14 via an elongated rigid moment arm in order to provide an increased leverage for controlling the pitch of cabin 14 and/or to compensate of any changes in longitudinal center of gravity of cabin 14 in the fore-aft direction due to, for example, passenger movement within the cabin. Instead of a forewing, the vessel may have an aftwing, similar to an empennage of an aircraft, to provide a rearward moment arm to control cabin pitch. Cabin 14 may also be aerodynamically formed for decreased wind resistance although not shown as such here. The foredeck of the vessel may also include a windshield (not shown) to shield cabin 14 against wind forces either when extended or retracted. Aft deck 16 may also include a series of scuppers 24 to provide drainage when taking on water. Cabin 14 may also include scuppers.

When tethered or floated over deck 16, a series of extension arms 26 freely guide and suspend cabin 14 in an elevated position without any rigid, shock transmitting mechanical connection to aft deck 16 or hull 12. This way, wave impact forces upon hull 12 are not transmitted to cabin 14 thereby resulting in a smooth, stable ride for extreme comfort for any passengers. Respective guide pins 28 coupled to the sides of cabin 14 slideably engage and interlock with extension arms 26 to allow unimpeded vertical excursions of cabin 14, and also, to provide stops at a minimum and a maximum vertical position along extension arms 26. As indicated above, space on deck 16 below cabin 14, when raised and secured at a fixed height, may be used for other purposes when circumstances and sea conditions permit.

FIG. 2 shows an example of how a cockpit or cabin 14 may be freely suspended above deck 16 between upper and lower limits. In the illustrated embodiment, locking pins 28 slideably interlock within a slot 27 of extension arm 26 to allow unimpeded vertical movement of cabin 14 within limits defined by upper and lower stops or ends of slot 27, i.e., upper and lower limits of cutouts in the extension arm 26. Stops may also be provided by other means, such as, a stop limiting structure positioned with or anywhere on the hull structure, deck, or a movable element of the cabin or suspension system thereof. Should space on aft deck 16 be required for cargo carriage under cabin 14, for example, stops or cutouts in extension arms may provide a restrict the lower limit of the cabin excursions.

The arms 26 pivot around an axis of pillow block 30 and are held in place by locking pin 32. A pair of springs 34, 36 may hold each extension arm 26, and consequently cabin 14, in a longitudinally neutral position in the fore-aft direction of the vessel. When vessel 10 is underway at high speeds, wings 18, 22 lift the cabin 14 above aft deck 16 so that each corner of cabin 14 freely floats on its respective extension arm 26. Instead of employing springs 34 and pillow blocks 30, positional neutrality may be achieved by providing elasticity via a material property and cross-sectional shape of arms 26 comprising a flexible high-strength polymer, carbon fiber, or stainless steel that are fixedly attached to deck 16. Optionally, a stabilizing gyroscope 36 may be affixed to cabin 14 to provide additional stability and/or positional control of the cabin. Also, pillow blocks 30 may be replaced with a universal joint assembly, as shown in FIG. 3, to provide two-axis rotation at each connection point with aft deck 16. This allows a lateral skewing movement of extension arms 26 during any side shifting of cabin 14 which, in effect, provides three-axis movement of cabin 14.

FIG. 2 also shows a series of biasing springs 40 interconnecting locking pins 28 and upper portion of extension arms 26 to provide a biasing lift, which may offset any portion amount of weight of cabin 14 (e.g., up to 80% to 95% of the cabin weight) in order to lessen lifting force that the wing structure 18 needs to provide in order to levitate or raise cabin 14 above aft deck 16. In the illustrated embodiment, cockpit 14 includes a helm station 11 having steering wheel 12 that controls a rudder of the vessel via flexible cable or hydraulic line 38 that enables functionality even as the cockpit is being upwardly and downwardly displaced. Helm station 11 may also include controls for the ship's engine (e.g., a throttle controller), generator, lighting systems (e.g., switches), trim tabs, electronic and navigation systems via one or more flexible cables 39 (mechanical cable control, electrical conductor, fiberoptic or hydraulic line) that couples the respective component of the vessel. Helm station 11 may also include flight controls (mechanical cable, hydraulic, or electrical, fiberoptical) for maneuvering or reorienting cockpit/cabin when aerodynamically suspended and/or for raising and lowering cockpit/cabin 14. It should be noted that, for purposes of illustration, that cockpit/cabin 14 is open and exposed rather than being enclosed. In actual implementation of the invention, cockpit/cabin 14 would be enclosed to protect occupants and crew against wind forces; possess a windshield in front and transparent windows in starboard, port and aft sections; and/or be aerodynamically shaped to reduce air resistance at high speeds.

FIG. 3 shows an alternative connection mechanism for cabin 14 comprising mechanical elements 28, 31, 33, and 35 of a tethering arm 26 of FIG. 2 to enable two-axis pivoting about axes 37, 39 thereof, similar to a universal joint, which allows both abeam displacement as well as fore-aft displacement of the cabin/cockpit while maintaining a level attitude or orientation. This also enables three-axis rotation of cabin 14, i.e., pitch, yaw, and roll control even though tethered at four corners. Thus, cabin 14 may move longitudinally, laterally, or vertically within limits established by the various linkages between cabin 14 and aft deck 16. Limit stops may also be provided to define excursion limits.

Figure 4:
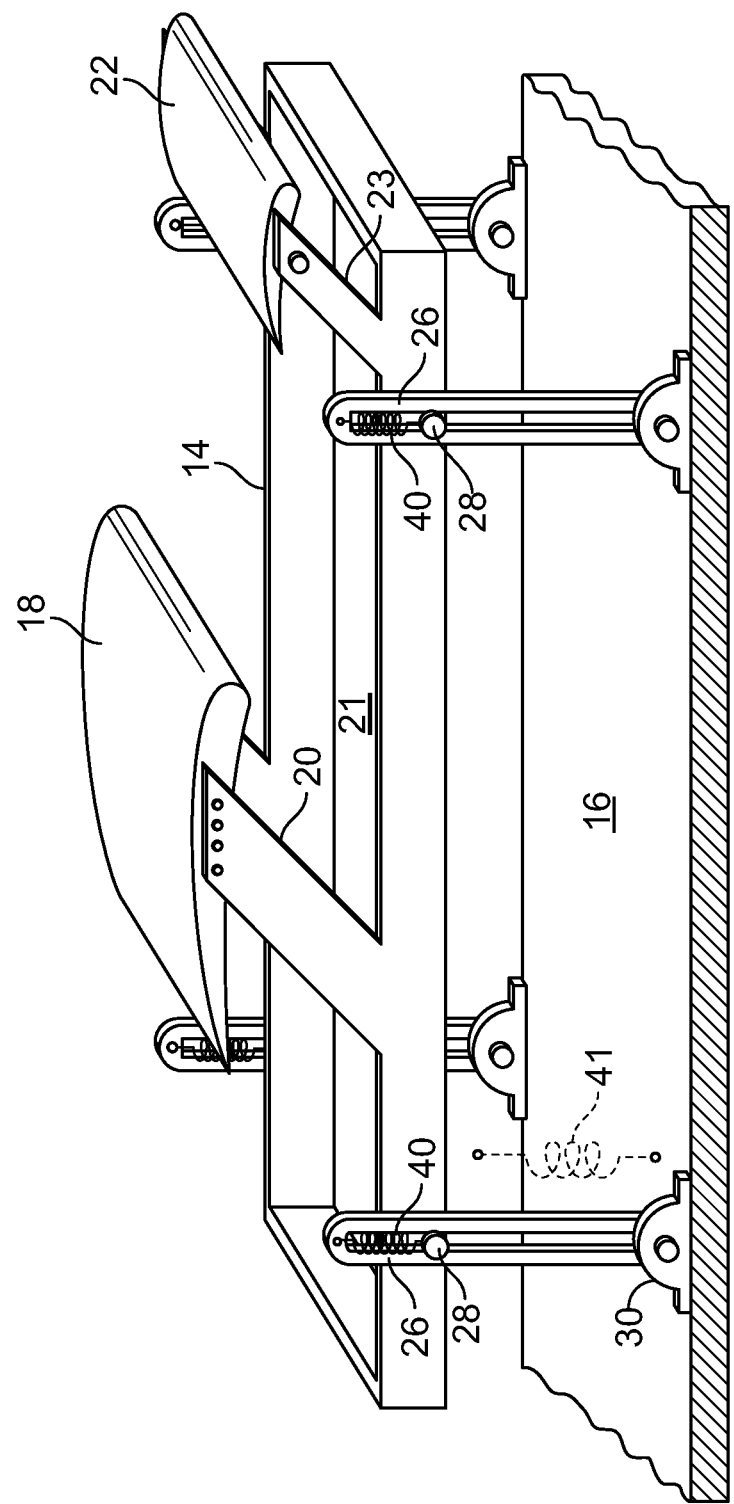
FIG. 4 illustrates an arrangement where biasing springs (or other biasing element) may be incorporated into the tethering or suspension structure, which applies a partial lifting force to the cabin/cockpit in order to reduce weight-lifting requirements of the wing structure to elevate the cabin/cockpit to an extended vertical position as the vessel approaches an aerodynamic lifting speed.

FIG. 4 illustrates an arrangement where biasing springs 40 or other biasing mechanism may be incorporated into the tethering or suspension structure for applying a partial lift to the cabin/cockpit. This helps to reduce weight lifting requirements of the wing structure 18 to elevate the cabin/cockpit to an extended vertical position as the vessel approaches an aerodynamic lifting speed. Here, at each extension arm 26, bias spring 40 applies an upward force to cabin or cockpit 14 by way of an attachment to locking pin 28. The upward biasing force at each arm 26 is designed for the upward force needed thereat since each corner of the cabin may have a different loading. Alternatively, a secondary spring 41 (shown in ghost format) may be fixedly interconnected between locking pin 28 and pillow block 30 (or aft deck 16) to apply a downward bias force so as to position cabin/cockpit 14 in or about a vertically neutral or equilibrium position. This way, a variety of anticipated loading conditions or a range of weights of cockpit/cabin 14 may be accommodated. Accordingly, the vessel operator may be less concerned with passenger loads while the suspension system absorbs upward and downward shock impacts due to wave action on vessel 10. Moreover, when the wing structure 18 aerodynamically lifts cabin 14 with a force beyond that of the cabin weight, secondary springs 41 at each corner of the carriage provides a lifting force to the remaining weight of the vessel thereby reducing the vessel's displacement in water and improving the vessel's fuel economy.

Figure 5A:
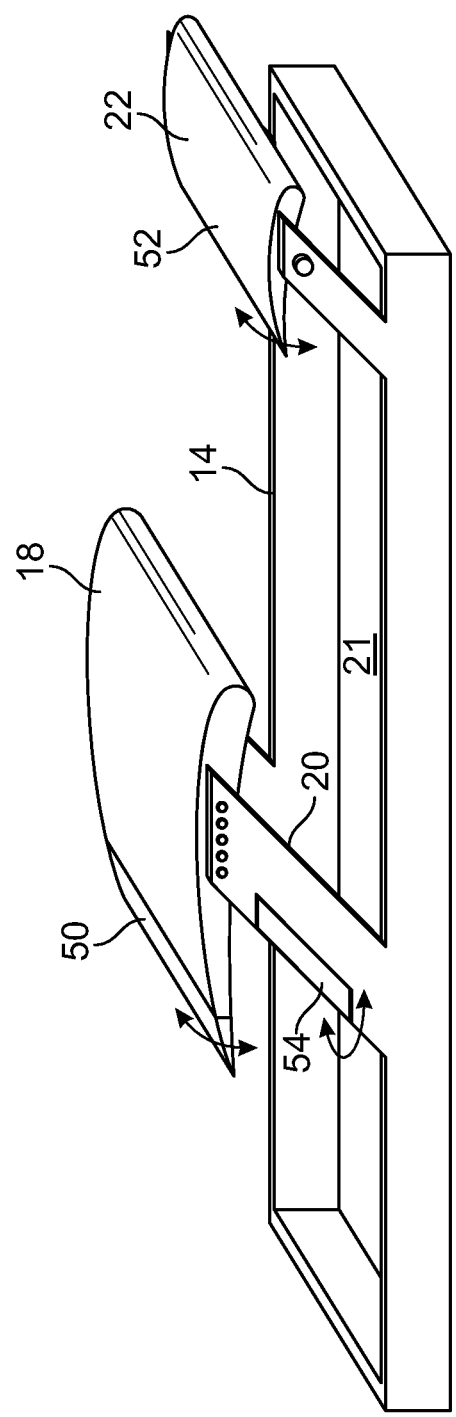
FIG. 5A shows surface control elements, such as elevator, rudder, slats, or flaps that may be incorporated into the wing structure to provide additional positioning control of the cabin/cockpit when aerodynamically lifted to an extended position.

In yet another embodiment, the configuration of FIG. 5A provides a surface control element or flap 50 of wing structure 18, a similar flap 52 of forewing 22, and a rudder control element 54 of strut 20 acting as a vertical stabilizer. Similar to an aircraft, various control elements including an elevator, rudder, slats, or flaps that may be incorporated into the structure of the wing or strut to provide addition positioning control of the cabin/cockpit when aerodynamically lifted to an extended position. Trim tabs (not shown) may also be provided on control surfaces, as known in the art. Manual operator control or automatic control via a computerized controller may be provided via control cabling interconnecting the control elements as known in the art. Such control may be provided at a helm station located within cockpit 14 (FIG. 2).

Figure 5B:
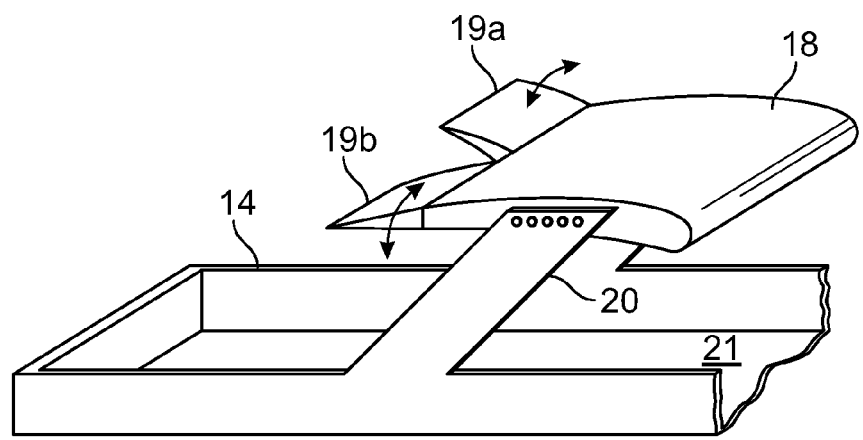
FIG. 5B shows an optional aileron structure that may be incorporated into the wing structure to enable roll control of the cabin or cockpit.

FIG. 5B shows optional conventional counter-pivoting ailerons 19a, 19b that may be incorporated into the wing structure 18 to provide, offset or compensate for rolling movement of the vessel. A conventional aircraft-like cable control and pulley system may be provided at the helm 11 (FIG. 2) of the vessel 10.

Figure 6:
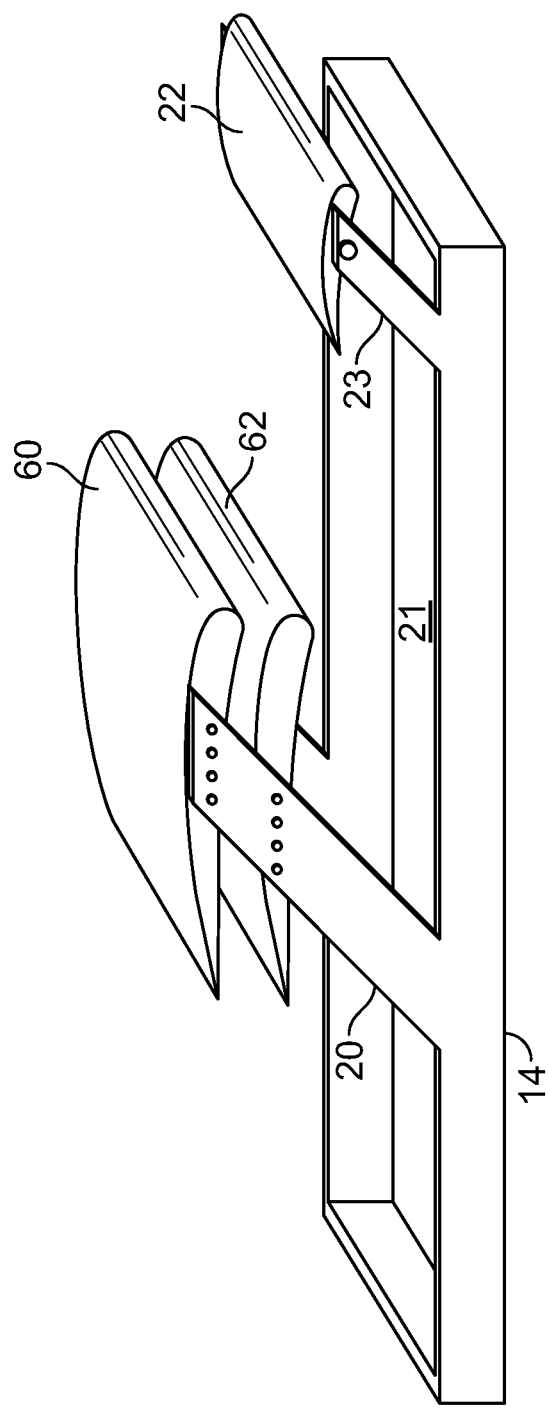
FIG. 6 illustrates a multi-wing structure (e.g., bi-wing, tri-wing, or a ganged multilayered wing ensemble) that may be utilized for additional lifting force that may needed, for example, for a heavier cabin/cockpit or for heavy cargo loads.

FIG. 6 illustrates a multi-wing structure 60 and 62, which may comprise a bi-wing, tri-wing, or a ganged multilayered wing ensemble in order to provide additional lift for a heavy a cabin/cockpit 14 or heavy loads thereof. Using multiple wings, the lifting force is increased for a given angle of attached and/or speed of the cabin relative to wind. Ailerons as shown in FIGS. 5A and 5B may be provided on one or more of the ganged wings structures.

Figure 7:
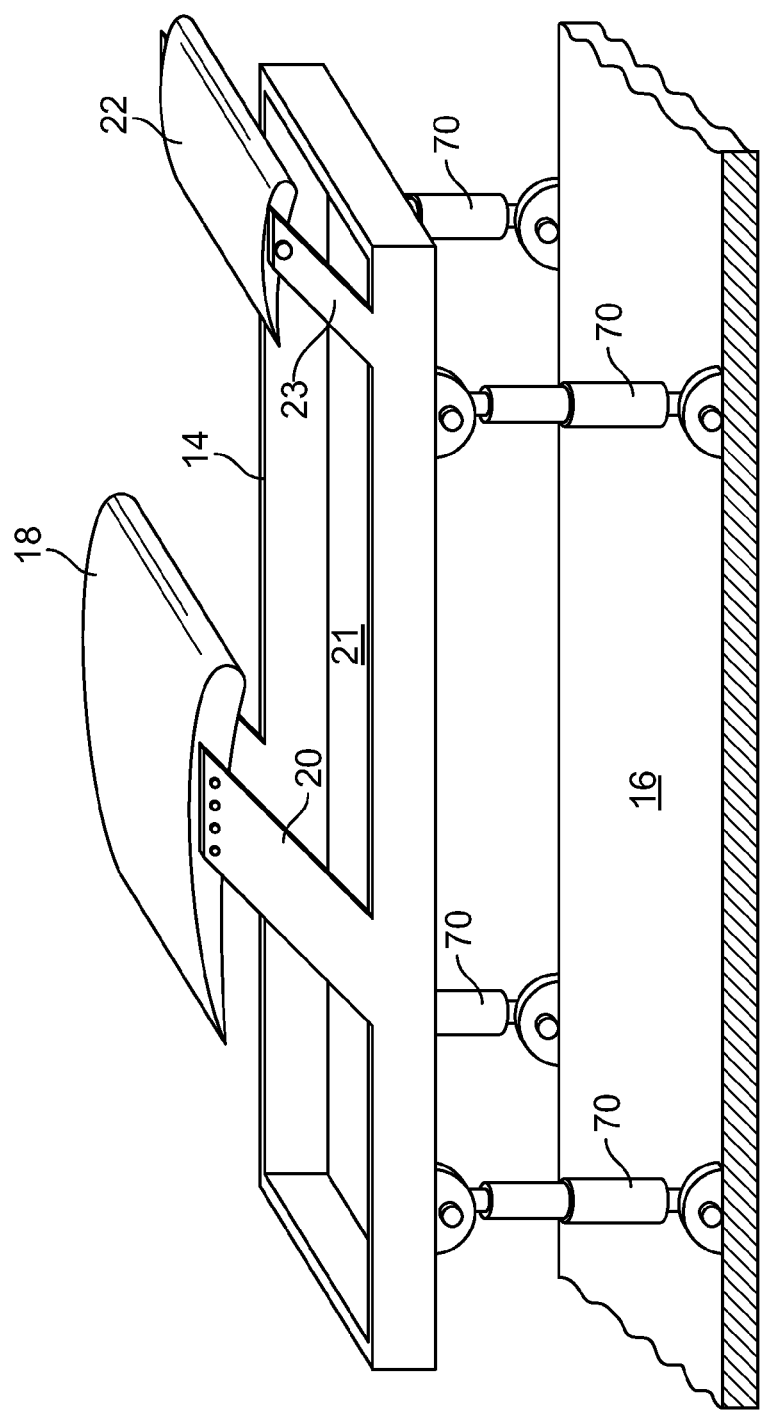
FIG. 7 illustrates an alternative tethering structure comprising telescoping arms to enable free unimpeded suspension or displacement of an elevated cabin or cockpit, which telescoping arms may be air-pressurized to provide a lifting bias, or alternatively, to elevate the cabin/cockpit to a docking level for passenger/cargo ingress/egress at a port facility.

FIG. 7 illustrates an alternative suspension structure comprising telescoping arms 70 to enable free unimpeded suspension or floating of an elevated cabin or cockpit 14 relative to aft deck 16 of vessel 10. Each telescoping arm may be air-pressurized to provide a lifting bias, or alternatively, to elevate the cabin/cockpit to a docking level for passenger/cargo ingress/egress at port.

Figure 8:
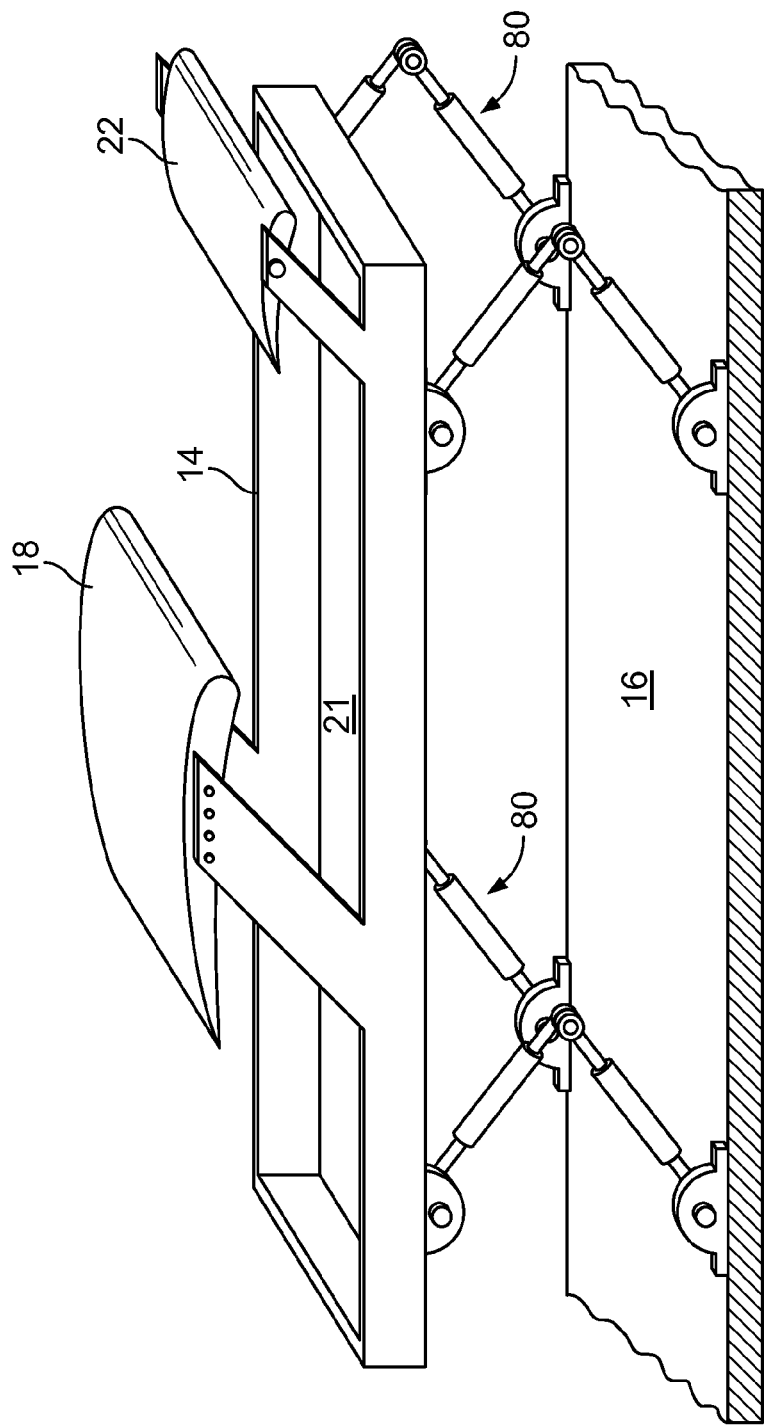
FIG. 8 illustrates yet another tethering structure comprising articulated jointed arms to enable free suspension or displacement of an elevated cabin or cockpit.

FIG. 8 illustrates yet another tethering structure comprising articulated jointed extension arms 80 to enable free unimpeded suspension or displacement of an elevated cabin or cockpit 14 when the vessel is underway at aerodynamic effective speeds.

Figure 9:
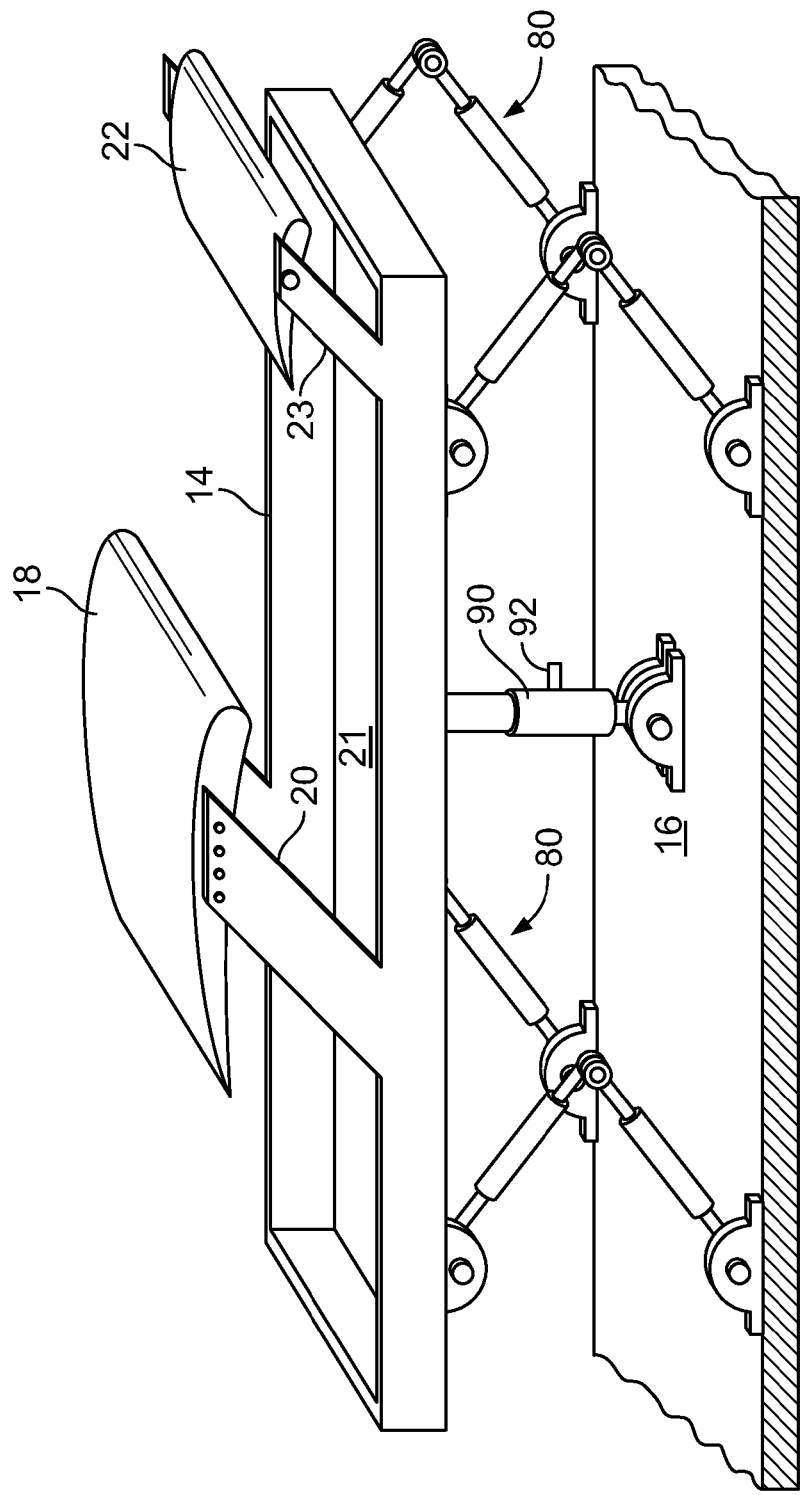
FIG. 9 illustrates an additional optional feature of the invention comprising a hydraulic air cylinder to provide a biasing lift, and or retraction, to assist cabin/cockpit lifting at planing speeds of the vessel and/or to raise or lower the cabin/cockpit to an ingress/egress level when docked at port.

FIG. 9 illustrates an additional optional feature of the invention comprising a hydraulic air cylinder 90 to provide a biasing lift to assist raising the cabin/cockpit at planing speeds of the vessel and/or to raise or lower the cabin/cockpit 14 to a passenger/cargo ingress or egress level when landed at port. Cylinder 90 includes a port 92 for receiving or expelling pressurized air. Once raised to a desired vertical level, cabin 14 may be locked in place to prevent movement by conventional means.

Figure 10:
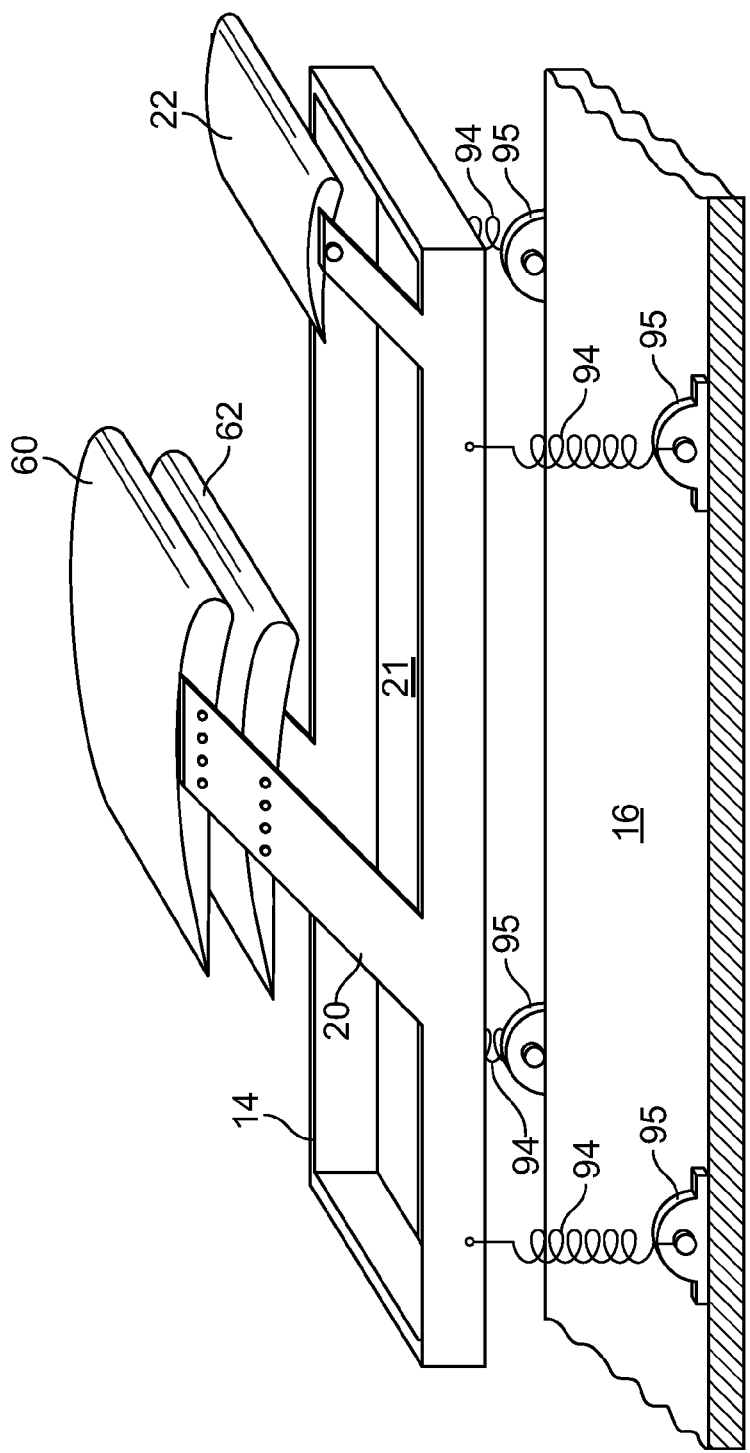
FIG. 10 shows an embodiment of the invention incorporating a series of lifting springs to form a spring force mechanism to apply lifting force to the remaining weight of the vessel after the cabin is aerodynamically lifted by wing structure.

FIG. 10 shows an embodiment of the invention incorporating a series of lifting springs 94 to form a spring force mechanism to apply excess lifting force to the remaining weight of the vessel after the cabin is aerodynamically lifted by wing structure 60 and 62. This embodiment may also incorporate any of the suspension mechanisms, stops, cabin guides, and biasing mechanisms shown herein, or any other functionally equivalent mechanical system. Assuming wing structure 60, 62 provides a lifting force beyond that of the weight of cabin 14 at a given air speed; the excess lifting force is then transferred to the vessel's hull structure through deck attachments 95. Although a bi-wing is shown, functionality of this embodiment may be accomplished with a single wing or multiple wings.

Although illustrated with vessels generally within the ten to fifty meter range, principles of the invention may be applied to smaller vessels, personal watercraft, or even high speed ships desiring an aerodynamically suspended and stabilized platform or cabin. Rather than suspending the entire passenger cabin or cockpit, only a portion thereof may be suspended. Aside from the specific mechanical elements illustrated, their functionality may be carried by other mechanical or electromechanical structures based on the teachings herein. The suspension systems shown may be reversed as between connection points on cabin and deck or hull structure. Instead of four struts, suspension legs, tethering links, three links forming a tripod suspension or more than four links may be employed in a super suspension system. A single or dual gimbaled tethering support structure may be used with or without guide rods in order to aerodynamically suspend the cabin. Thus, the invention is defined by the appended claims.

The invention claimed is:
1. A high-speed marine vessel comprising:
a hull structure,
a cabin,
a wing structure coupled to said cabin to aerodynamically lift and suspend the cabin in response to vessel speed, said wing structure having a span substantially coincident with or less than a beam width of said vessel but having a lifting capacity exceeding the weight of said cabin and a desired load thereof for a given speed of operation of said vessel, a suspension and tethering mechanism interconnecting said cabin and said hull structure to allow substantially free, unimpeded excursions of said cabin within predetermined limits when aerodynamically suspended, wherein said excursions are adjusted according to wave height, wave period or wave steepness, and a helm station to control said vessel while the cabin is aerodynamically lifted and suspended.

2. The vessel of claim 1, further including a biasing spring to apply an upward lifting force to the cabin in order to reduce aerodynamic lifting requirements of said wing structure to elevate said cabin.

3. The vessel of claim 1, further including a stabilizing gyroscope coupled to said cabin to stabilize orientation of said cabin against pitch and/or rolling motions.

4. The vessel of claim 1, wherein the suspension and tethering mechanism comprises suspension arms that further include biasing springs to hold said suspension arms in a near-vertical position.

5. The vessel of claim 1, wherein said wing structure further includes aerodynamic control surfaces including at least one of an aileron, trim tab, wing flap, or wing slat.

6. The vessel of claim 1, wherein said wing structure further includes a vertical stabilizer with a rudder control surface.

7. The vessel of claim 1, wherein said cabin further includes a secondary forewing coupled thereto to provide additional lift and pitch control to compensate for any changes in longitudinal center of gravity of said vessel.

8. The vessel of claim 1, where said wing structure comprises a multi-wing structure having a span confined within the beam of said vessel to provide additional lifting force for said cabin for a given air speed or angle of attack.

9. The vessel of claim 1, wherein said suspension mechanism comprises one of elongated suspension arms, telescoping arms, or articulated arms having pivoting joints.

10. A method of reducing wave impact forces on a cabin of a marine vessel when underway in rough water, said method comprising:

providing a cabin for said vessel, providing a wing structure coupled to said cabin, wherein said wing structure has a span substantially coincident with the width of said vessel but having a lifting capacity exceeding the weight of said cabin and a desired load thereof for a given speed of operation of said vessel, providing a suspension system that permits unimpeded vertical, lateral or longitudinal excursions of said cabin between certain limits relative to said vessel in accordance with wave action encountered when underway at high speed, accelerating said vessel to an aerodynamic lifting speed for said cabin, and aerodynamically lifting said cabin away from a structure of said vessel whereby to reduce wave impact forces on said cabin.

11. The method of claim 10, further comprising the step of: applying an upward biasing force to the cabin to reduce amount of lift required of the wing structure to raise the cabin.

12. The method of claim 10, further comprising the step of: applying a biasing force to position the cabin between upper and lower limits of said suspension system.

13. The method of claim 10, further comprising the step of: utilizing a stabilizing gyroscope coupled to said cabin to stabilize orientation of the cabin against pitch and/or rolling motions.

14. The method of claim 10, further comprising the step of: biasing said suspension system to hold the cabin in a neutral fore-aft position when aerodynamically lifted by the wing structure.

15. The method of claim 10, further comprising the step of: providing an aerodynamic control surface for said wing structure that comprises at least one of an aileron, trim tab, wing flaps, or wing slats.

16. The method of claim 10, further comprising: providing a multi-wing structure to provide increased lift for said cabin.

17. A cabin assembly capable of being freely floated between upper and lower limits when elevated above a hull structure of a marine vessel, said cabin assembly comprising:

a wing structure to aerodynamically lift the cabin assembly from the hull structure in response to vessel speed, said wing structure having a span that does not substantially protrude beyond a beam width of said vessel but having a lifting capacity exceeding the weight of said cabin assembly and a desired load thereof for a given speed of operation of said vessel, a suspension mechanism coupled with said hull structure to allow substantially free, unimpeded vertical excursions of said cabin assembly between said upper and lower limits when aerodynamically suspended, and a helm station to control the vessel during aerodynamic suspension of the cabin when proceeding over water.

18. The cabin assembly of claim 17, further comprising a biasing mechanism to apply an upward biasing force to said cabin assembly in order to reduce weight-lifting requirements of said wing structure.

19. The cabin assembly of claim 17, further comprising a forewing to provide addition lift and/or pitch control of said cabin assembly when aerodynamically suspended to compensate for any changes in longitudinal center of gravity when underway.

20. The cabin assembly of claim 17, further comprising a lifting mechanism to position height of said cabin assembly at an ingress/egress level when docked at a port facility in order to facilitate loading and unloading of said vessel.

* * * * *